Patented Jan. 30, 1940

2,188,746

UNITED STATES PATENT OFFICE 2,188,746

METHOD OF PRODUCING COMPLEX METAL AMINE SALTS

Frederick C. Bersworth, Verona, N. J., assignor to The Martin Dennis Company, Newark, N. J., a corporation of New Jersey No Drawing. Original application February 18, 1936, Serial No. 64,501. Divided and this application December 19, 1936, Serial No. 116,815

7 Claims. (Cl. 260—438)

The present invention relates to a method of producing complex metal amine salts.

It is an object of my invention to form complex metal amine salts directly in an economical manner so that they may be available commercially for a number of uses to which they are adapted.

It is a further object of my invention to produce these complex metal amine salts without the intermediate preparation of an amine.

The structure of complex metal amine salts is not understood with certainty. One theory that may be used in explaining their nature is the Werner coordination theory. My process and the compounds produced thereby are not dependent in any way upon or limited by this theory or any other particular theory or explanation. However, I find it convenient to employ this theory in explaining my invention.

According to the Werner coordination theory many metals have not only primary valences but also secondary or auxiliary valences. In explaining these valences it is assumed, according to the theory, that the metal atom draws to itself, in the form of a surrounding shell, and by forces other than by the primary valences, coordinated atoms or groups, usually six in number. The central metallic atom with its coordinated groups constitutes a nucleus which is generally illustrated as an octahedron with the metal located in the center and the six coordinated atoms or groups located at the six points of the octahedron. This nucleus acts as the cation in the compound. Outside the nucleus are located atoms or groups constituting the ions or anions which are held to the metal by the primary valences.

Practically all of the metals, except the metals of the alkali group, form a complex compound of the Werner type. This is particularly so in the case of the heavier metals. As a typical example, chromic chloride, $CrCl_3.6H_2O$ has the following formula:

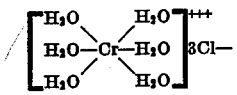

The groups or atoms in the nucleus may vary, for example, another chromic chloride of the formula $CrCl_3.4H_2O$, has the following formula:

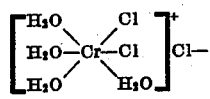

Ammonia and amine groups may be substituted in the nucleus to form metal complexes. It is this latter type of metal amine complex which I believe is prepared in accordance with my invention. For example, ethylene diamine may be substituted in the nucleus, as follows:

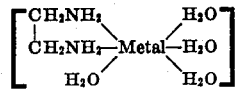

A typical compound prepared in accordance with my invention is chromium ethylene diamine dichloride:

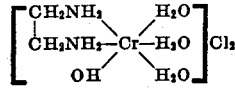

The complex metal ammonia salts are relatively unimportant and useless because of the low vapor pressure of ammonia as well as comparatively low dissociation temperature of a complex. The amines, however, which have a higher boiling point and a higher vapor pressure, form complex metal amine salts which have a much higher dissociation temperature and are therefore more stable.

The properties of the complex metal amine salts will vary with the amine present in the nucleus. The higher the boiling point of the amine the higher will be the dissociation temperature of the salt. The solubility of the salt in both water and organic solvents will vary with the amine in the nucleus. For example, ethyl amine and ethylene diamine will form complexes which would be water soluble. However, higher amines such as amyl amine will form complexes which are much less water soluble but which would be soluble in organic solvents and oils.

The complex metal amine salts find many uses, for example in the leather tanning industry, electroplating, etc.

Heretofore in producing complex metal amine salts a process has been employed in which the amine is reacted with a metal salt to produce the complex metal amine salt. The preparation of the amines is a long and expensive process and consists essentially in the reaction of ammonia and an organic halide followed by vacuum distillation and involved drying operations. Due to the fact that the preparation of amines requires a long and expensive process, they have not been available to make the production of complex metal amine salts economically and commercially possible.

In my method I eliminate the intermediate production of the amine and form the complex metal amine salt directly by reacting together a metal salt or hydroxide, an organic halide and ammonium hydroxide. The reacting components may be brought together in different orders and under different conditions. The metal salt or hydroxide and the ammonium hydroxide may be reacted together and the organic halide added thereto, or the ammonium hydroxide and the organic halide may be reacted together and the metal salt or hydroxide added to form the complex. While it will generally not be commercially expedient, all the reacting materials may be brought together simultaneously.

In accordance with one embodiment of my process, ammonium hydroxide and an organic halide are heated under pressure to yield an amine hydrohalide. The excess of ammonia, that remains after the reaction, is recovered. To the fairly dilute solution of the organic amine hydrohalide is added a salt or a hydroxide of a metal capable of forming a Werner complex. A sufficient amount of ammonia may be retained in the mixture to neutralize the hydrohalide of the amine if a salt is employed, or sodium hydroxide may be added for this neutralization, if desired. If the metal hydroxide is used the neutralization is not necessary. As a more specific illustration of my process, 8 parts of ammonium hydroxide and 1 part of ethylene dichloride are heated under pressure to yield ethylene diamine hydrochloride, water and an excess of ammonia. The excess of ammonia is removed and a theoretical amount of solution of chromium chloride is introduced into the mixture under pressure along with sufficient sodium hydroxide to neutralize the hydrochloride in the ethylene diamine. The resulting compound will be complex chromium ethylene diamine dichloride. The sodium hydroxide may be omitted if sufficient ammonia remains to neutralize the hydrohalide. If chromium hydroxide is introduced instead of chromium chloride the sodium hydroxide or ammonium for neutralization will be unnecessary.

In accordance with another variation in my process, the metal salt or hydroxide is dissolved in an excess of ammonium hydroxide and this is reacted with a theoretical amount of an organic halide. As a specific illustration of this variation, chromic hydroxide is dissolved in an excess of ammonium hydroxide and into this mixture is introduced a theoretical quantity of ethylene dichloride. After the reaction, the excess of ammonia may be removed and the complex metal amine salt may be recovered from the reaction mixture.

In any of the variations of my process, when the hydroxide of the metal is employed, the complex metal amine salt will be the other product of the reaction and may be easily recovered. When the salt is employed and an excess of ammonia is present, or sodium hydroxide is added, to neutralize the hydrohalide of the amine, a simple ammonium or sodium salt will also be present. Spray drying is a convenient method of obtaining the product from the reaction mixture.

The salt or hydroxide of any metal may be used which will form a Werner complex, i. e., any metal other than the alkali metals. The higher metals, particularly chromium, iron, palladium, copper, zinc, cobalt and nickel, are mentioned in particular because of their commercial importance. Any salt may be used in addition to the halides, for example, the sulfate, nitrate, etc., including basic salts. In the above illustration, for example, if chromium sulfate is employed instead of chromium chloride, the final product would be complex chromium ethylene diamine sulfate.

Any organic halide may be employed, the chlorides, bromides and iodides are mentioned in particular because of their commercial availability. The organic radical may be the aliphatic radical, such as ethyl, methyl, propyl, amyl, stearyl, etc. Unsaturated radicals, such as ethylene, isopropylene and acetylene may be included, as well as any aromatic radical, for example, the phenyl, naphthyl, or tolyl radicals.

The amounts of the organic halide and ammonia in relation to the metal salt will depend upon the number of amine groups it is desired to introduce into the nucleus.

The particular amine radical to be introduced into the nucleus will be determined by the organic halide employed. As explained heretofore the organic halide to be selected will depend upon the properties desired in the complex metal amine salt.

Although the reaction produces heat, nevertheless it is generally carried out under heated conditions. However heat is not necessary, and if it is convenient to remove the heat, which is produced, the reaction could be carried out at lower temperatures.

In order to prevent any material loss of ammonia the reaction is generally carried out in a closed system, and therefore, it is convenient to employ pressure although the pressure is not essential to the reaction.

It will be obvious that my process can be carried out in any number of ways either as a continuous or discontinuous operation, and that in carrying it out a great variety of organic halides and metal salts may be employed. I intend my invention to be generic to all of the procedural variations, and to variations in the reacting components employed, as is indicated within the scope of the claims:

This application is a division of my application Serial No. 64,501, filed February 18, 1936.

I claim:

1. A method of producing complex metal amine salts which comprises dissolving in an excess of ammonium hydroxide a soluble salt of a strong mineral acid and a metal capable of forming a Werner complex, and introducing a hydrocarbon halide into the solution.

2. A method of producing complex metal amine salts which comprises dissolving in an excess of ammonium hydroxide a soluble salt of a strong mineral acid and a heavy metal, and introducing a hydrocarbon halide into the solution.

3. A method of producing complex metal amine salts which comprises dissolving in an excess of ammonium hydroxide a soluble salt of a strong mineral acid and a metal capable of forming a Werner complex, and introducing an alkyl chloride into the solution.

4. A method of producing complex metal amine salts which comprises dissolving in an excess of ammonium hydroxide a compound selected from the group consisting of the soluble salts of strong mineral acids and of the metals chromium, iron, palladium, copper, zinc, cobalt and nickel, and introducing an alkyl chloride into the solution.

5. A method of producing complex metal amine salts which comprises dissolving a soluble chromium salt of a strong mineral acid in an excess of ammonium hydroxide, and introducing an alkyl chloride into the solution.

6. The method of producing a complex metal amine salt which comprises dissolving a soluble chromium salt of a strong mineral acid in an excess of ammonium hydroxide, and introducing ethylene dichloride into the solution.

7. A method of producing complex metal amine salts which comprises dissolving chromium chloride in an excess of ammonium hydroxide, and introducing an alkyl chloride into the solution.

FREDERICK C. BERSWORTH.

CERTIFICATE OF CORRECTION.

Patent No. 2,188,746. January 30, 1940.

FREDERICK C. BERSWORTH.

It is hereby certified that error appears in the printed specification of the above numbered patent requiring correction as follows: Page 2, first column, line 60, for the word "other" read only; and that the said Letters Patent should be read with this correction therein that the same may conform to the record of the case in the Patent Office.

Signed and sealed this 12th day of March, A. D. 1940.

(Seal)

.an Arsdale,
Acting Commissioner of Patents.